(12) United States Patent
Seitz et al.

(10) Patent No.: US 11,344,902 B2
(45) Date of Patent: May 31, 2022

(54) POWDER CONVEYING DEVICE FOR COATING POWDER AND POWDER COATING SYSTEM COMPRISING A POWDER CONVEYING DEVICE

(71) Applicant: Wagner International AG, Altstatten (CH)

(72) Inventors: Kurt Seitz, Widnau (CH); Beat Untersee, Altstätten (CH); Kevin Luzi, Altstätten (CH); Urban Bischofberger, Berneck (CH)

(73) Assignee: Wagner International AG, Altstatten (CH)

( * ) Notice: Subject to any disclaimer, the term of this patent is extended or adjusted under 35 U.S.C. 154(b) by 0 days.

(21) Appl. No.: 16/750,047

(22) Filed: Jan. 23, 2020

(65) Prior Publication Data

US 2020/0238314 A1    Jul. 30, 2020

(30) Foreign Application Priority Data

Jan. 25, 2019   (EP) .................................... 19153649

(51) Int. Cl.
   *B65G 53/66*   (2006.01)
   *B05B 7/12*    (2006.01)
   *B05B 12/00*   (2018.01)

(52) U.S. Cl.
   CPC .............. *B05B 7/12* (2013.01); *B05B 12/004* (2013.01)

(58) Field of Classification Search
   CPC ............ B65G 53/66; B65G 2812/1625; B65G 53/525; B65G 53/18; B65D 88/72; B65D 88/548
   USPC ......... 406/22, 28, 29, 50, 85, 124, 127, 137, 406/138, 33
   See application file for complete search history.

(56) References Cited

U.S. PATENT DOCUMENTS

| | | | | |
|---|---|---|---|---|
| 3,606,476 A | * | 9/1971 | Smith | B65G 53/30 406/33 |
| 3,937,521 A | * | 2/1976 | Reuter | B65G 53/22 406/25 |
| 4,368,678 A | * | 1/1983 | Ulveling | C21B 5/003 110/347 |

(Continued)

FOREIGN PATENT DOCUMENTS

| | | |
|---|---|---|
| EP | 0 297 463 A1 | 1/1989 |
| EP | 2 962 766 A1 | 1/2016 |

(Continued)

OTHER PUBLICATIONS

European Search Report for corresponding Application No. 19153649.9, dated Jul. 23, 2019.

*Primary Examiner* — Joseph A Dillon, Jr.
(74) *Attorney, Agent, or Firm* — Renner, Otto, Boisselle & Sklar, LLP

(57) ABSTRACT

A powder conveying device for coating powder includes a powder conveyor having a powder outlet duct and a powder outlet valve for opening or for closing the powder outlet duct. Additionally, a setpoint value generator for specify a setpoint opening period of the powder outlet valve, and a sensor for determining the actual opening period of the powder outlet valve are provided. The powder conveying device furthermore includes an evaluation unit for determining the deviation between the setpoint opening period and the actual opening period.

14 Claims, 7 Drawing Sheets

(56) References Cited

U.S. PATENT DOCUMENTS

| | | | | |
|---|---|---|---|---|
| 4,525,105 A * | 6/1985 | Jaggi | ................... | B65G 53/66 406/50 |
| 4,900,199 A * | 2/1990 | Spaulding | ............ | B05B 7/1445 406/121 |
| 5,505,566 A * | 4/1996 | Gruber | ................. | B05B 7/1472 406/12 |
| 5,615,832 A * | 4/1997 | Price | .................... | B05B 7/1404 137/489.5 |
| 5,702,209 A * | 12/1997 | Mauchle | ............... | B05B 7/1404 406/12 |
| 6,287,056 B1 * | 9/2001 | Szikszay | ................ | B65G 53/12 406/127 |
| 6,413,020 B1 * | 7/2002 | Davison | ................. | B65G 53/24 406/145 |
| 6,494,645 B1 * | 12/2002 | Seitz | .................... | B05B 7/1454 406/24 |
| 7,241,080 B2 * | 7/2007 | Klobucar | ............. | B05B 7/1459 406/106 |
| 7,972,087 B2 * | 7/2011 | Davison | ............ | A22C 21/0053 406/28 |
| 8,057,129 B2 * | 11/2011 | Kleineidam | .......... | B05B 7/1459 406/50 |
| 8,113,745 B2 * | 2/2012 | Aoki | .................... | B65G 53/525 406/197 |
| 8,231,310 B2 * | 7/2012 | Sanwald | ............... | B05B 7/1472 406/34 |
| 8,491,226 B2 * | 7/2013 | Kleineidam | .......... | B05B 7/1459 406/50 |
| 9,181,045 B2 * | 11/2015 | Reilley | ................... | B65G 53/60 |
| 9,815,074 B2 * | 11/2017 | Mauchle | ................... | F04F 1/18 |
| 9,834,391 B2 * | 12/2017 | Mauchle | ................... | F16K 7/07 |
| 2002/0136609 A1 * | 9/2002 | Maguire | ................. | B65G 53/24 406/151 |
| 2016/0016186 A1 | 1/2016 | Hofschulte | | |
| 2017/0173610 A1 * | 6/2017 | Altin | ....................... | B05B 14/48 |
| 2017/0210574 A1 * | 7/2017 | Ellis | ......................... | B65G 53/60 |
| 2019/0100391 A1 * | 4/2019 | Managan, II | .......... | B65G 67/24 |
| 2019/0111445 A1 | 4/2019 | Lutz | | |
| 2019/0263602 A1 * | 8/2019 | Berg | ...................... | B65G 51/30 |

FOREIGN PATENT DOCUMENTS

| | | |
|---|---|---|
| EP | 3 162 448 A1 | 5/2017 |
| EP | 3 238 832 A1 | 11/2017 |
| GB | 2 512 026 A | 9/2014 |

* cited by examiner

POWDER CONVEYING DEVICE FOR COATING POWDER AND POWDER COATING SYSTEM COMPRISING A POWDER CONVEYING DEVICE

TECHNICAL FIELD

The invention relates to a powder conveying device for coating powder and to a powder coating system comprising a powder conveying device.

PRIOR ART

A powder conveying device for conveying coating powder to a powder applicator is known from the prior art EP 3 238 832 A1. The powder conveying device comprises a working container, which can be pressurized and which comprises a powder inlet and a powder outlet, wherein the powder outlet is connected to a powder outlet valve. A powder line is furthermore provided, which is connected to the powder outlet valve on the inlet side and which has an inlet for transport air on the inlet side. The powder line can be connected to a powder applicator on the outlet side. Additionally, a controller, which controls the amount of powder to be conveyed, in that it repeatedly opens and closes the powder outlet valve. It has been shown that in the case of the conveying device, the actually conveyed amount of powder differs from the desired amount of powder to be conveyed on a case-by-case basis. This may lead to unwanted fluctuations in response to the powder conveyance.

DESCRIPTION OF THE INVENTION

It is an object of the invention to specify a powder conveying device for coating powder and a powder coating system, wherein the amount of powder, which is actually conveyed per time unit, follows a specified setpoint value even more exactly.

The deviations between the setpoint value for the conveying amount and the actually conveyed amount of powder can be reduced even further in an advantageous manner by means of the invention.

The object is solved by means of a powder conveying device comprising one or more of the features described herein.

The powder conveying device according to the invention for coating powder comprises a powder conveyor comprising a powder outlet duct and a powder outlet valve for opening or for closing the powder outlet duct. Additionally, a setpoint value generator for specify a setpoint opening period of the powder outlet valve, and a sensor for determining the actual opening period of the powder outlet valve are provided. The powder conveying device furthermore comprises an evaluation unit for determining the deviation between the setpoint opening period and the actual opening period.

The object is additionally solved by means of a powder coating system comprising one or more of the features described herein.

The powder coating system according to the invention comprising the above-described powder conveying device comprises a powder applicator, which is connected to the powder conveying device via a powder line.

Advantageous further developments of the invention follow from the features specified in the dependent patent claims.

In the case of an embodiment of the powder conveying device according to the invention, the sensor is arranged in immediate proximity to the powder outlet valve. This reduces the risk that disturbance variables, which cannot be traced back to the outlet valve, are detected by the sensor. Additionally, the inertia of the measuring system can be reduced.

The sensor is preferably located on the outlet side of the powder outlet valve.

In the case of another embodiment of the powder conveying device according to the invention, the sensor is embodied as influence sensor. This has the advantage that the measurement can take place in a contact-free manner and that the powder flow in the powder duct is not influenced by the measurement.

In the case of a further embodiment of the powder conveying device according to the invention, the sensor is embodied as optical sensor or as density sensor or as microwave sensor. This solution also has the advantage that the measurement can take place in a contact-free manner and that the powder flow in the powder duct is not influenced by the measurement.

In the case of a further development of the powder conveying device according to the invention, a regulating unit, which serves the purpose of minimizing the deviation between the setpoint opening period and the actual opening period. The actual value can thus advantageously be made to automatically track the setpoint value. This increases the conveying accuracy even further.

In the case of an additional further development of the powder conveying device according to the invention, the powder conveyor has a further powder outlet duct and a further powder outlet valve. The further powder outlet valve is provided for opening or for closing the further powder outlet duct. A further sensor for determining the actual opening period of the further powder outlet valve is furthermore provided. Advantageously, more powder can thus be conveyed and the actually conveyed amount of powder can simultaneously be maintained exactly.

The evaluation unit of the powder conveying device according to the invention can be embodied and operated in such a way that it also serves to determine the deviation between the setpoint opening period of the further powder outlet valve and the actual opening period of the further powder outlet valve. The conveying accuracy can thus be further optimized.

In the case of the powder conveying device according to the invention, a further setpoint value generator for specify a setpoint opening period of the further powder outlet valve can be provided. Different conveying amounts can thus be specified. The powder conveying device can thus for example provide a first powder applicator with a first amount of powder, and a second powder applicator with a second amount of powder.

Advantageously, the evaluation unit of the powder conveying device according to the invention can additionally be embodied and operated in such a way that it can be used to compare the actual opening period of the powder outlet valve to the actual opening period of the further powder outlet valve. Advantageously, the accuracy of the results can thereby be further increased.

In the case of the powder conveying device according to the invention, it can be provided that the powder conveyor has a powder working container, which can be pressurized.

In the case of the powder conveying device according to the invention, it can additionally be provided that the powder conveyor comprises an injector.

In the case of the powder conveying device according to the invention, it can furthermore be provided that the powder conveyor comprises a dense flow feed pump.

In the case of the powder conveying device according to the invention, the powder outlet valve can finally be embodied as tube squeezer.

BRIEF DESCRIPTION OF THE DRAWINGS

The invention will be described in more detail below by means of a plurality of exemplary embodiments on the basis of a plurality of figures.

DETAILED DESCRIPTION OF THE INVENTION

Figure 1:
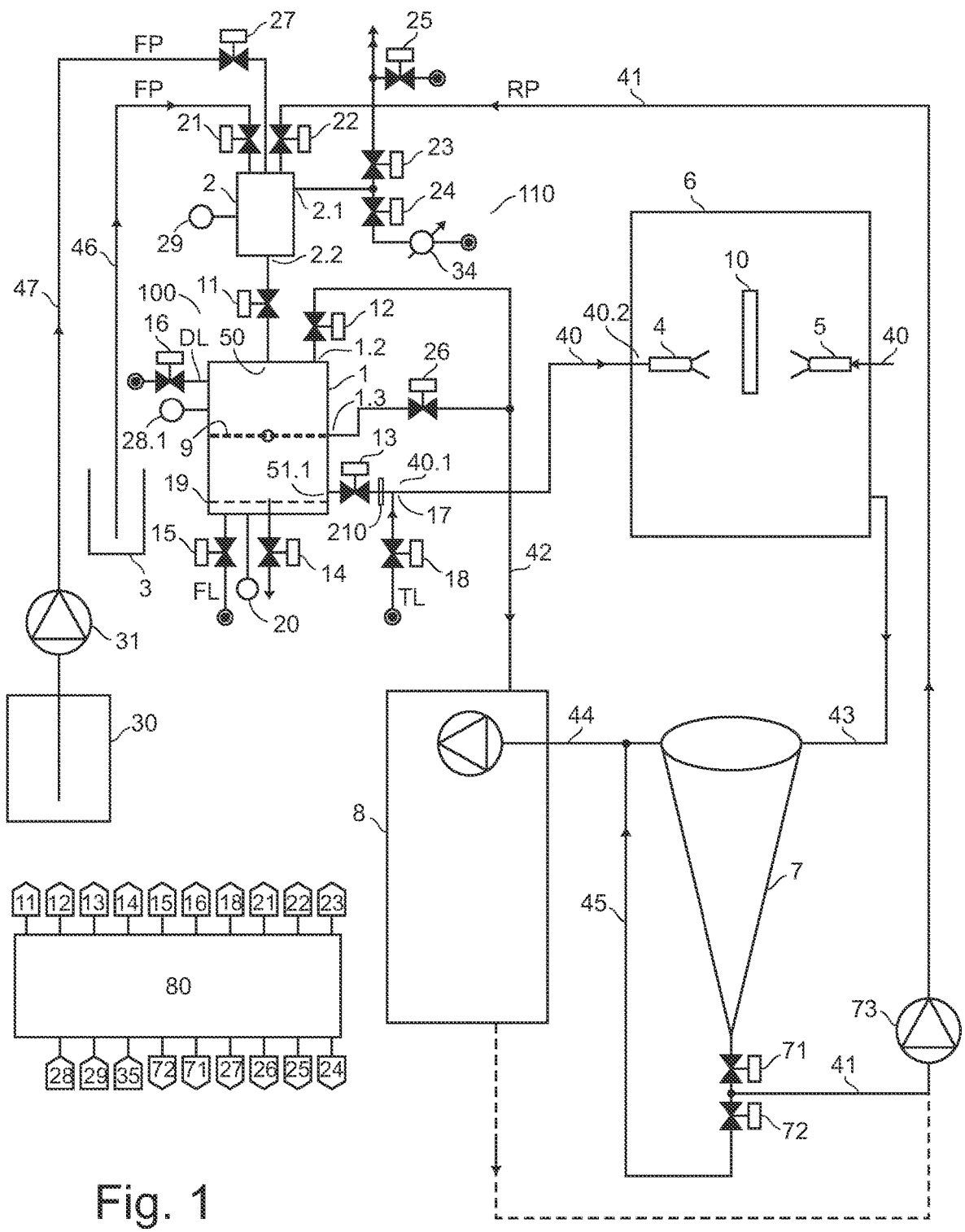
FIG. 1 shows a possible embodiment of a powder coating system comprising the powder conveying device according to the invention in a block diagram.
Figure 2:
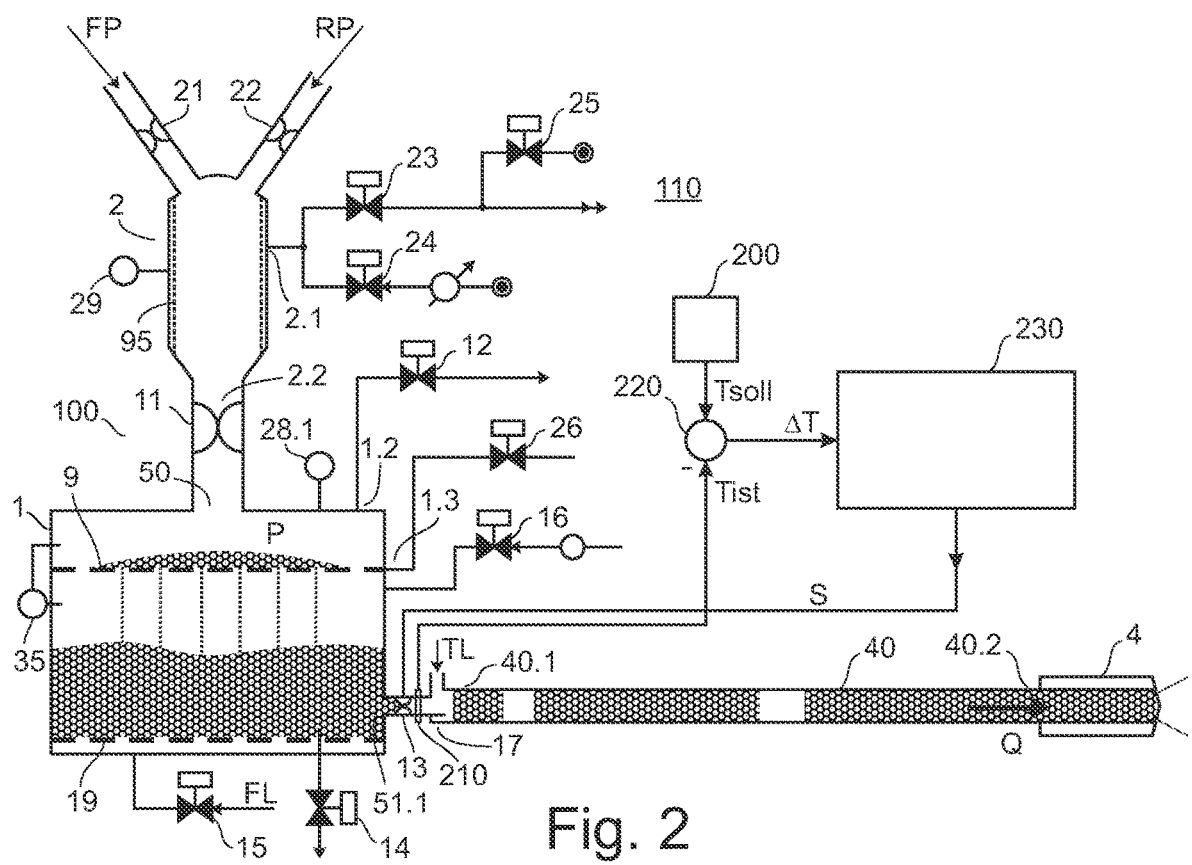
FIG. 2 shows a possible embodiment of the powder conveying device according to the invention in a schematic diagram.

FIG. 1 shows a possible embodiment of a powder coating system comprising a possible powder conveyor 100 in a block diagram. The general setup of a possible embodiment of the powder conveying device 110 according to the invention is illustrated in FIG. 2. The powder conveying device 110 for conveying coating powder to a powder applicator 4 comprises a working container 1. The latter is embodied to be pressure-tight, so that it can be pressurized. The maximum working pressure in the working container 1 preferably lies below 0.5 bar, because the European Pressure Equipment Directive 97/23/EG thus does not need to be applied and lower technical demands are thus made on the setup of the working container 1.

In one embodiment, the working container 1 comprises a powder inlet 50, which is also referred to in short as inlet, and a powder outlet 51.1, which is also referred to in short as outlet. The powder outlet 51.1 is connected to a powder outlet valve 13. A powder line 40 is additionally provided, which is connected to the powder outlet valve 13 on its inlet-side end area 40.1. In the following, the term inlet-side refers to the inlet-side end area 40.1 of the powder line 40, which is located on the upstream side of the powder line 40.

In addition to the connection for the outlet of the powder outlet valve 13, the powder line 40 additionally also has a transport air connection 17 on the inlet side comprising an inlet 17.1 for transport air TL. In FIG. 1, the powder line 40 is connected to a powder applicator 4 on the outlet side. In the following, the term outlet-side refers to the outlet-side end area 40.2 of the powder line 40, which is located on the downstream side of the powder line 40.

A sensor 210 is located in the proximity of the powder outlet valve 13. The sensor 210 is preferably arranged in the immediate proximity of the powder outlet valve 13. The sensor 210 will be discussed in more detail below.

The powder outlet 51.1 is preferably located in the lower area of the working container 1. This has the advantage that all of the powder can readily be transported out of the working container 1. A fluidizing device 19, by means of which the powder located in the working container 1 can be fluidized, is also located in the lower area of the working container 1. The fluidizing device 19 has a separating wall, which preferably runs horizontally, of a porous material, which can be, for example, a semi-permeable material, which is air-permeable. The powder located above the porous separating wall is swirled up by means of fluidizing air FL, which is guided through the porous separating wall from below, and is put into a floating state. This process is referred to as fluidizing. The fluidized powder located above the fluidizing device 19 can then be transported out of the working container 1 through the powder outlet 51.1. To be able to control the fluidizing air FL, a valve 15 is provided. The valve 15 can be embodied, for example, as air quantity regulating valve. A vibrating device 20, which has, for example, a vibrating motor, can additionally be mounted to the working container 1, in order to support the creation of a homogenous powder-air mixture.

A connection for a further valve 14 can likewise be provided in the lower area of the working container 1. The residual powder, which has not already been removed via the outlet 51.1, can be removed from the working container 1 via the valve 14.

A screen 9, which is preferably embodied as ultrasonic screen, can furthermore be arranged in the working container 1. The screen 9 divides the interior of the working container 1 into an upper chamber and into a lower chamber. The powder, which has reached into the upper chamber of the working container 1 via the powder inlet 50, is screened with the help of the screen 9. Powder clumps and impurities are held back thereby. The powder, which has been screened and which is ready for removal, is located in the chamber below the screen 9. To be able to clean the screen 9, it can be pivoted out of the horizontal and can be brought into an inclined position, so that the residual powder and/or the held-back material lying on the screen 9 can slide down from the screen 9.

Powder can be extracted from the screen 9 via a cleaning connection 1.3. The cleaning connection 1.3 is connected to the afterfilter 8 via the valve 26 and a line 42. To clean the screen 9, the valve 26 is opened. The working container 1 is thereby still supplied with compressed air, in order to maintain the positive pressure in the working container 1. The accumulated dirt is now blown from the screen 9 through the line 42 to the afterfilter 8 by means of the positive pressure, which still prevails in the working container 1. For the period, in which the valve 26 is open, a reduced pressure can result in the working container 1. The cleaning of the screen 9 thus preferably takes place during a coating pause, thus during the period, in which no powder is conveyed. The valve 26 and the line 42 thus serve to discharge dirt.

A compressed air connection, which is connected to a compressed air source via a valve 16, can additionally be provided on the working container 1. When the valve 16 is open, compressed air DL can flow into the working container 1. The working container 1 can thus be pressurized, and the desired working pressure in the working container 1 can be set. The desired working pressure in the working container 1 can instead also be generated via the supplied fluidizing air FL and via the compressed air DL.

The fluidizing air FL is usually sufficient to generate the desired working pressure. However, if for example a great many powder outlet valves 13 are open, it could happen that the fluidizing air FL alone is not sufficient to maintain the working pressure. The compressed air DL is additionally used in this case to maintain the working pressure and to optionally compensate pressure fluctuations in the working container 1. The compressed air DL can be supplied independently of the fluidizing air FL. To obtain a well-fluidized powder-air mixture, it is advantageous when the fluidizing air FL is set to a certain value. The compressed air connection for the compressed air DL can be arranged, for example, in the upper area of the working container 1 as suggested in FIG. 1. The compressed air connection can also be arranged at a location of the working container 1, which makes it possible that the viewing windows 92 (FIG. 8) can be blown free of adhering powder by means of the compressed air DL. The compressed air DL can also be used to compensate compressed air losses, which result from smaller leakages.

The working container 1 can furthermore have a ventilation connection 1.2, which is connected to a valve 12, which serves as ventilation valve. The ventilation connection 1.2 can be connected, for example, to an afterfilter 8 via the valve 12. The ventilation connection 1.2 and the valve 12 can also serve the purpose of ensuring that the pressure in the working container 1 does not exceed a certain maximum pressure. The ventilation connection 1.2 and the valve 12 can additionally be used to keep the working pressure in the working container 1 constant.

The powder inlet 50 is preferably located in the upper area of the working container 1. It can be arranged, for example, in the cover of the working container 1. The powder inlet 50 is connected to the powder outlet 2.2 of an intermediate container 2 via a powder valve 11, which is embodied, for example, as squeezer. The intermediate container 2 is usually arranged above the working container 1. The force of gravity can be utilized in this way to transport powder located in the intermediate container 2 downwards into the working container 1.

In the case of an embodiment of the working container 1, the powder inlet 50 is located in the middle of the cover of the working container 1, as it is suggested in FIG. 2. This has the advantage that the powder also falls onto the middle of the screen 9, so that it distributes better over the entire screen 9. The powder inlet 50 can instead also be located laterally on the working container 1 above the screen 9.

The intermediate container 2 can also be arranged next to the working container 1 in such a way that the powder outlet 2.2 of the intermediate container 2 and the powder inlet 50 of the working container 1 are still located above the screen 9. The force of gravity can also be utilized here to transport powder located in the intermediate container 2 downwards into the working container 1.

In the embodiment shown in FIG. 1, the intermediate container 2 has a powder inlet and a powder inlet valve 21 on the inlet side, via which fresh powder FP can be sucked or pumped into the intermediate container 2. The intermediate container 2 additionally has a further powder inlet and a powder inlet valve 22 on the inlet side, via which recycled powder RP can be sucked into the intermediate container 2. The two powder inlet valves 21 and 22 can be embodied as squeezers. It is also possible, however, to provide only one powder inlet and one powder inlet valve on the intermediate container 2, via which either fresh powder FP or recycled powder RP can then be suctioned or pumped.

The supply of the intermediate container 2 can take place, for example, via a powder storage container 3 and a powder line 46. The intermediate container 2 can instead also be supplied with fresh powder FP via a powder storage container 30, a powder pump 31, and a powder line 47.

In contrast to the illustration in FIG. 1, a mixture of fresh powder FP and recycled powder RP can be located in the powder storage container 3 or in the powder storage container 30 or also in both containers. The intermediate container 2 can thus also be supplied with a mixture of recycled powder RP and fresh powder RP via the containers 3 or 30, respectively.

The powder storage container 30 is often a so-called bigbag, which is also referred to as flexible intermediate bulk container or FIBC in short. The powder storage container 30 usually contains larger amounts of powder than the powder storage container 3. The powder storage container 30 is usually also located farther away from the intermediate container 2 than the powder storage container 3. The powder storage container 30 can thus be located at a distance of, for example, 30 m from the intermediate container 2, whereas the powder storage container 3 is located, for example, 5 m away from the intermediate container 2.

In the case of the powder storage container 3, the powder is conveyed into the intermediate container 2 via the negative pressure, which prevails in the intermediate container 2. No further powder conveying device is thus necessary and is thus cost-efficient.

When the powder storage container 30 is used, for example, in the form of a bigbag, larger amounts of powder are usually also conveyed. For this, it is advantageous when an additional powder conveying device, such as, for example, the powder pump 31, is used. The prevailing negative pressure thereby helps to remove the air from the intermediate container 2. The excess air in the intermediate container 2 can be discharged via the opening 2.1. A back pressure is thus not generated in the intermediate container 2.

It may also be advantageous when a plurality of intermediate containers 2 are present, via which the working container 1 is supplied with powder. The intermediate containers 2 can be mounted above the working container 1. When using two intermediate containers 2, they can be operated, for example, in a phase-shifted manner; while the one suctions powder, thus operates in the suctioning phase, the other one, which operates in the discharge phase, transports the powder into the working container 1. The working container 1 is continuously filled with powder in this way. Large amounts of powder can thereby be conveyed into the working container 1.

The intermediate container 2 has a connection 2.1, via which compressed air can be applied to the intermediate container 2. For this purpose, the connection 2.1 can be connected to a compressed air source via a valve 24. The valve 24 forms a controllable compressed air source with the compressed air source. A pressure regulating valve 34, which can be arranged between the compressed air source and the valve 24, can be part of the controllable compressed air source.

The compressed air can also be discharged from the intermediate container 2 via the same connection 2.1. For this purpose, the connection 2.1 can be connected to the surrounding area via a valve 23. However, the compressed air can also be extracted from the intermediate container 2 via the connection 2.1, and a negative pressure can be generated. For this purpose, a vacuum valve 25 is additionally provided. When the valve 23 is open, a negative pressure is applied at the connection 2.1. The actual negative pressure generation can take place by means of a Venturi pump.

On principle, the compressed air sources illustrated in the block diagram according to FIG. 1 can be regulated compressed air sources, which generate a constant pressure or a constant amount of air.

All valves 11 to 16, 18, and 21 to 26 can be controlled by means of a control unit 80, which will also be referred to below as controller. If necessary, the valves 71 and 72 can also be controlled by means of the controller 80. The control unit 80 can be used for controlling as well as for regulating.

The mode of operation of the intermediate container 2 will be described in more detail below. It will be assumed that the intermediate container 2 is initially free from powder. In a first step, the valves 11, 21, 22, 24, and 27 are closed, so that powder neither reaches into the intermediate container 2, nor is powder removed from the intermediate container 2. The valve 23 and the vacuum valve 25 are now opened, in order to generate a negative pressure in the intermediate container 2. As soon as the valve 21 or 27, respectively, for fresh powder FR or the valve 22 for recycled powder RP is opened, powder is sucked into the intermediate container 2. There is no need to wait until a negative pressure is built up in the intermediate container 2, but the powder inlet valve 21, 22 or 27, respectively, can already be opened beforehand. When sufficient powder has accumulated in the intermediate container 2, the valve 21 or 27, respectively, for fresh powder FP or the valve 22 for recycled powder RP, respectively, is closed again. For this purpose, the valve 21, 22 or 27, respectively, can be opened for a certain time period, for example for 6 seconds. The outlet valve 11 is opened subsequently, so that the powder can reach out of the intermediate container 2. This can take place by utilizing the force of gravity. To support the powder transport from the intermediate container 2, compressed air can be blown into the intermediate container 2 via the connection 2.1. For this purpose, the valve 24 is opened. Due to the fact that the working container 1 is permanently pressurized during the conveying process, it is advantageous when the pressure in the intermediate container 2 is larger or at least exactly as large as the pressure in the working container 1. A pressure regulating valve 34 can be used to set the pressure. As soon as the powder has reached out of the intermediate container 2, the valves 11 and 24 are closed again. The intermediate container 2 can subsequently be filled again with powder in the above-described manner.

The pressure in the intermediate container 2 can also be measured directly in the intermediate container 2. The actual pressure, which actually prevails in the intermediate container 2, is thereby detected. It can now be ensured by means of a corresponding pressure regulation, which can be implemented, for example, in the controller 80, that the actual pressure in the intermediate container 2 does in fact correspond to the desired setpoint pressure. When the pressure in the intermediate container 2 is identical as the pressure in the working container 1, no pressure drop results in the working container 1 when the valve 11 is opened. An even powder conveyance to the powder applicator 4 or to the powder applicators, respectively, is thereby also ensured during the period, in which the working container 1 is filled with powder.

The mode of operation of the working container 1 will be described in more detail below. As soon as the powder valve 11 is open, the powder reaches out of the intermediate container 2 and into the working container 1. The powder falls onto the screen 9, is screened, and pours onto the fluidizing unit 19 from there. To remove the powder from the working container 1 to the powder applicator 4, the valve 18 is opened, so that transport air TL flows into the powder line 40. It is advantageous thereby when the valve 18 is permanently open, so that the transport air TL can flow into the powder line 40 continuously. As soon as the powder outlet valve 13 is opened, the positive pressure prevailing in the working container 1 ensures that the powder is conveyed out of the working container 1 and via the powder line 40 to the powder applicator 4. This state is also referred to as powder discharge phase A at the working container 1. While the powder is conveyed out of the working container 1, the valve 14 is closed. However, if a disturbance occurs in the working container 1 during the discharge phase A, for example if the pressure in the working container 1 rises above a certain amount, the valve 12 and/or the valves 11 and 22 can be opened.

To set the amount of powder Q, which is to be conveyed per time unit, it is provided to close the powder outlet valve 13 temporarily or to open it for a certain time period, respectively. A regulating unit 230 can specify, for how long the outlet valve 13 remains open or closed, respectively (FIG. 2). Together with the control unit 80, the regulating unit 230 can be accommodated in a common housing.

For this purpose, the regulating unit 230 can apply for example a control signal S in the form of a pulse to the control input of the outlet valve 13. The control signal S can be an electrical signal or also a compressed air signal. In a potentially explosive environment, it may be advantageous to use a compressed air signal as control signal S.

The regulating unit 230 can generate, for example, a pulse width modulated control signal S, which changes between two values (open or closed or 0 or 1, respectively). In the case of constant frequency F=1/TPWM, the duty cycle Tein/TPWM of the control pulse is thereby modulated. TPWM is thereby the period of the control signal S, and Tein is the width of the control pulse. The amount of powder Q, which is to be conveyed per time unit, can be set via the duty cycle or the pulse width Tein, respectively. The following applies thereby: the smaller the duty cycle, the lower the amount of powder Q, which is to be conveyed per time unit. If the duty cycle Tein/TPWM=0, no powder is conveyed. The amount of powder Q, which is to be maximally conveyed, is reached in the case of a duty cycle Tein/TPWM=1.

Figure 3A:
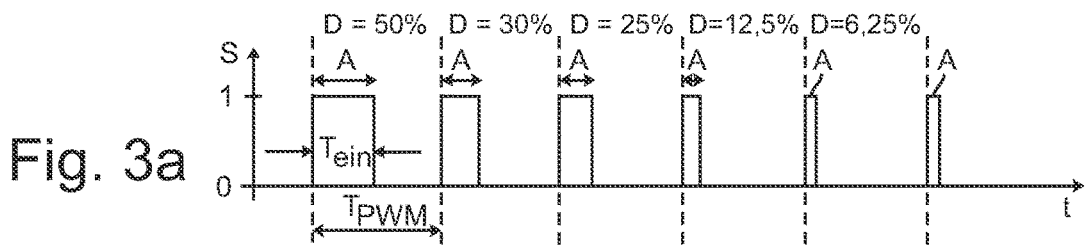
FIG. 3a shows the chronological sequence of the control signal for the powder outlet valve in a diagram.

A pulse width modulated control signal S over the time t is illustrated in an exemplary manner in FIG. 3a. S=1 thereby corresponds to the control command "open valve" at the outlet valve 13. The outlet valve 13 thus receives the control command "open valve" for the time period Tein. Due to tolerances in response to the production of the valve, the inertia of the mechanical valve components, dead times, valve wear, and other external influences (such as, for example, temperature and aging of the squeezer), however, the time period Tein does not correspond exactly to the time period, during which the powder can in fact flow through the outlet valve 13.

The time period Tist, during which the powder P actually flows through the outlet valve 13 into the powder duct 61.1 and is supplied to an evaluation unit 220, is now measured with the help of the sensor 210. From a setpoint value generator 200, the evaluation unit 220 additionally receives a setpoint value Tsoll, which corresponds to the desired time period, during which the outlet valve 13 is to be open. The evaluation unit 220 determines the deviation ΔT from the setpoint value Tsoll from the setpoint value Tsoll and the actual value Tist.

If the ΔT exceeds a certain specified threshold value, the evaluation unit 220 can output a, for example, optical or acoustic message to the operating personnel.

Instead of or in addition to this, it can also be provided that the evaluation unit 220 transfers the deviation ΔT to a regulating unit 230. The evaluation unit 220, the regulating unit 230, and the outlet valve 13 form parts of a regulating circuit in this case.

Figure 3B:
FIG. 3b shows the chronological sequence of the transport air pressure, which is fed in, in a diagram.
Figure 3C:
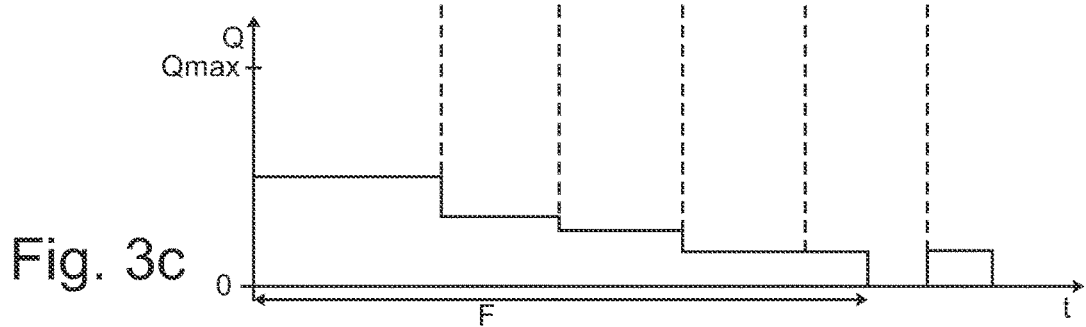
FIG. 3c shows the amount of powder conveyed per time in a diagram.

FIG. 3b shows the chronological sequence of the air pressure p(TL) of the transport air TL. In the present example, p(TL) is constant. FIG. 3c finally shows the amount of powder Q, which is conveyed per time, at the outlet 40.2 of the powder line 40 in an exemplary diagram. It can be seen thereby that—even when the outlet valve 13 is temporarily closed—powder is nonetheless conveyed. The reason for this is that the periods, during which the outlet valve 13 is closed, are short enough and that the transport air TL mixes with the powder in the powder line 40 over time. The fact that the powder flow in the inlet area 40.1 of the powder line 40 has been interrupted repeatedly by the outlet valve 13 cannot be determined at the outlet 40.2 any longer. A homogenous powder-air mixture is available at the outlet 40.2 of the powder line 40.

In the case of a preferred and tested embodiment, the amount of powder, which is to be conveyed, can be set to between 30 and 200 g/min. The powder conveying device 110 can also be adapted in such a way, however, that amounts of powder of between 10 and 5000 g/min can be conveyed. In the case of a tested embodiment, it was possible to convey the powder over a distance of between 5 and 30 m. The powder conveying device 110 can also be adapted in such a way, however, that the powder can be conveyed over distances of between 1 m and 50 m.

Powder lines 40 comprising an inner diameter of between 3 and 30 mm can be used for this purpose. In the case of the tested embodiment, different tubes comprising inner diameters of between 8 and 12 mm were used. However, standard tubes comprising an inner diameter of between 6 and 14 mm can also be used.

The inner diameter of the powder line 40 is selected on the basis of the amount of powder, which is to be conveyed. In the case of smaller amounts of powder, a powder line comprising a smaller inner diameter is usually sufficient. The transport air TL can be set in a range of between 0.1 and 50 Nm3/h (normal cubic meters per hour) or between 0.5 and 6 Nm3/h, respectively. The transport air TL can be set in a pressure range of between 0.1 and 10 bar. The inner diameter of the squeezer preferably lies in a range of between 3 and 10 mm, better yet between 3 and 5 mm. The total cycle time preferably lies in a range of between 100 and 300 ms. The pulse width can preferably be set in a range of between 5 and 90 or 290 ms, respectively.

The flow speed of the powder flow can be set via the pressure p(TL) of the transport air TL. The higher the transport air pressure p(TL), the more quickly the powder flows through the powder line 40, and the more quickly the powder cloud created by the powder applicator 4 expands.

A quick powder cloud is advantageous, if it is to penetrate far into the workpiece to be coated. This is helpful, for example, for a workpiece comprising a large depression. If, in contrast, the workpiece is relatively flat, a soft and thus slow powder cloud is used instead. The powder cloud can thus be adapted ideally to the geometry of the workpiece to be coated via the flow speed of the powder. The flow speed can additionally be adapted to the respectively used powder type (particle size, adhesion, etc.). As a whole, this leads to an optimized application efficiency. It can be ensured that powder can be conveyed consistently for a longer period, i.e. procedurally reliably, reproducibly and with little wear. Organic powder types and also inorganic powder types, such as, for example enamel, can be conveyed.

Instead of a pulse width modulated control signal S, a pulse frequency modulated or pulse density modulated control signal S can also be used. In the case of the pulse frequency-modulated control signal S, the pulse width Tein of the individual pulses is constant over time. The lower the pulse density, the lower the amount of powder Q, which is conveyed per time unit. If the pulse density is 1, the amount of powder Q, which is to be maximally conveyed, is reached.

Other pulse-coded control signals S can generally also be used, in order to set the amount of powder Q, which is to be conveyed. The term pulse-coded is to be understood here as conversion of an arbitrary numerical value into a binary pulse sequence.

Figure 8:
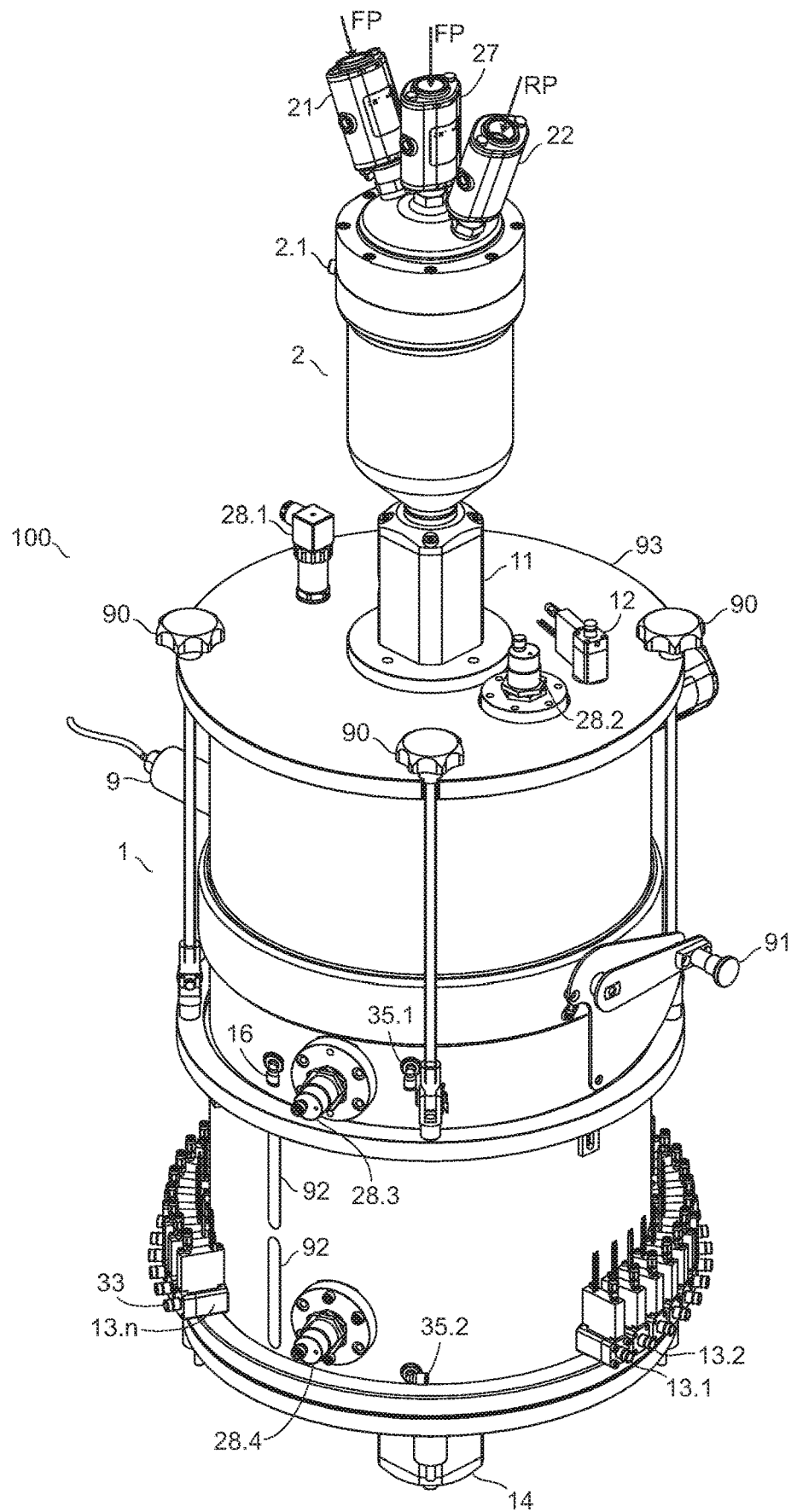
FIG. 8 shows a possible embodiment of the powder conveying device according to the invention in a three-dimensional view.
Figure 9:
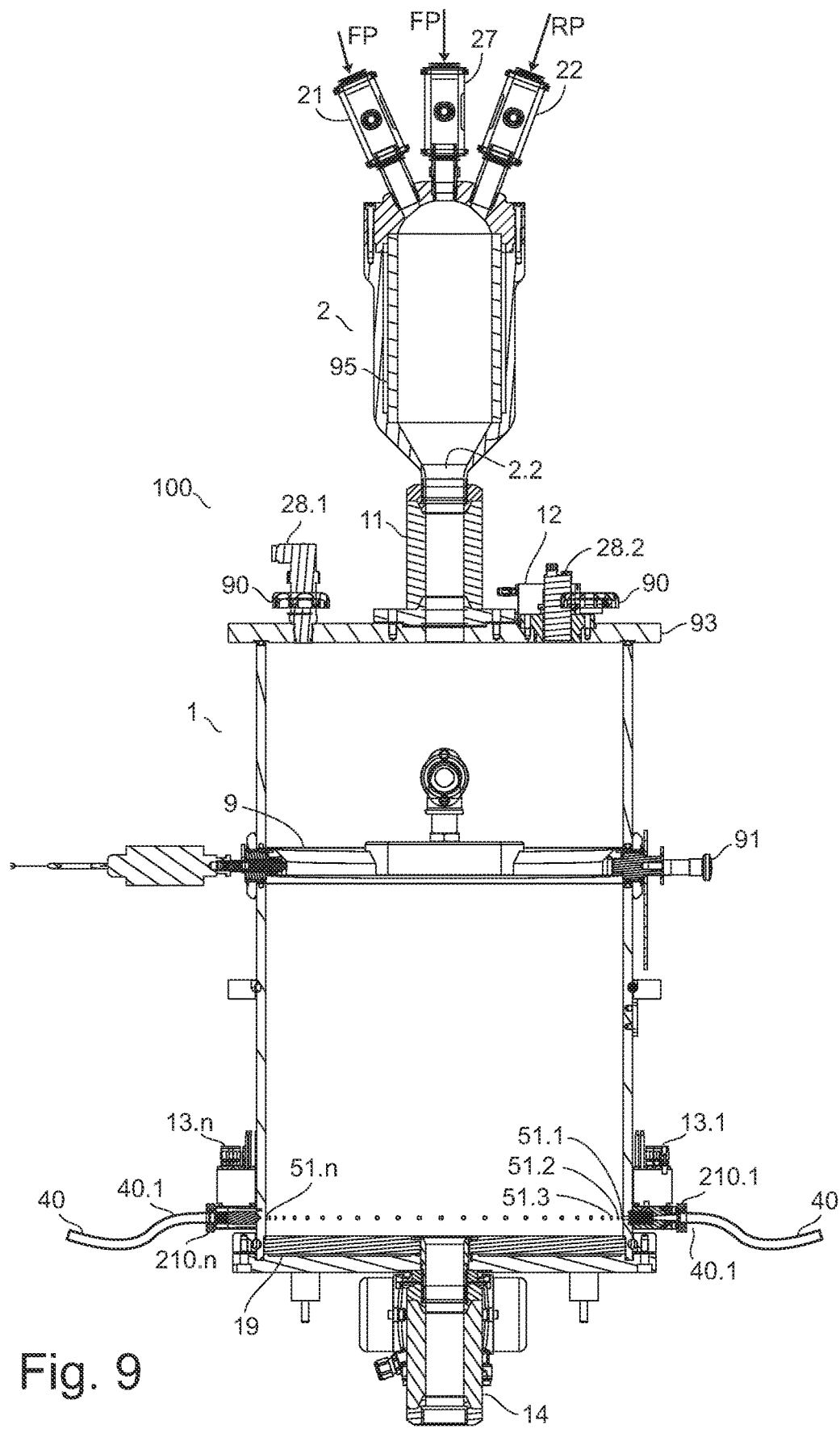
FIG. 9 shows the powder conveying device according to the invention in the longitudinal section.

FIG. 8 shows a further possible embodiment of the powder conveying device 110 according to the invention in a three-dimensional view. FIG. 9 shows the further embodiment of the powder conveying device 110 according to the invention in the longitudinal section. In the case of this embodiment, the working container 1 has n powder outlets 51.1-51.n, wherein each of the powder outlets 51.1-51.n is in each case connected to a powder outlet valve 13.1 to 13.n, in each case followed by a sensor 210.1-210.n. A powder line 40 and a powder applicator can in each case be connected to each of the powder outlet valves 13.1 to 13.n. The regulating device 230 can be embodied in such a way that each of the powder outlet valves 13.1 to 13.n can be controlled separately therewith. A high degree of flexibility is thus attained. For example the applicator, which is connected to the powder outlet valve 13.1, can thus be turned off, in that the powder outlet valve 13.1 remains permanently closed, while that applicator, which is connected to the powder outlet valve 13.2, is turned on, in that the powder outlet valve 13 is actuated accordingly. Additionally, it is possible to supply the individual applicators with different amounts of powder, in that the respective outlet valves 13 are actuated differently accordingly. The individual applicators can furthermore also each generate powder clouds having different speeds, in that the valves 18 for the transport air TL are set to correspondingly different amounts of transport air. It is also possible to use powder lines 40 of different lengths, wherein the length differences between the powder lines can be compensated by a corresponding, individual actuation of the outlet valves 13.

To be able to clean the screen 9, it can be pivoted out of the horizontal working position (see FIG. 5) and into an inclined position (not shown in the figures). A tilt mechanism 91 is provided on the working container 1 for this purpose. To be able to open the cover of the working container 1, a closure 90 is provided. Said closure can be embodied, for example, as screw or clamping mechanism. One or a plurality of viewing windows 92 can be arranged in the lower area of the working container 1. It can be provided that a further viewing window and a light source are located in the working container 1 on the opposite side of the viewing window 92. It is thus possible to visually detect the powder level in the working container 1 during operation, without having to open the working container 1. The visual detection can take place by means of sensors or by means of the operating personnel.

In the case of one embodiment, a capacitive sensor 28.2 is arranged on the working container 1 in the area of the upper chamber. The sensor 28.2 can be arranged, for example, on the cover 93 of the working container 1. By means of said sensor, the fill level in the upper chamber of the working container 1 can be detected, transmitted to the controller 80, and can be evaluated there. The controller 80 can determine in this way, whether sufficient powder trickles through the screen 9, or whether the screen 9 is clogged. The controller 80 can optionally respond accordingly, for example with a warning for the operating personnel.

In the case of a further embodiment, a further capacitive sensor 28.3 is arranged below the screen. The fill level in the upper chamber of the working container 1 can be detected and can be transmitted to the controller 80 by means of said further capacitive sensor. The controller 80 can evaluate the sensor signal and is thus able to determine, whether too much powder or too little powder is located in the upper chamber, and can react in that it outputs, for example, a warning for the operating personnel.

In the case of a further embodiment, a capacitive sensor 28.4 is arranged on the working container 1 in the area of the lower chamber.

Instead of the capacitive sensors 28.3 and 28.4, other sensors can also be used, if they are suitable for measuring the fill level.

In the case of a further embodiment, a connection 35.1 is provided in the area from the sensor 28.3 to the cover 93 of the working container 1, thus in the non-fluidized area. A connection 35.2 is provided between the bottom of the working container 1 and the sensor 28.4, so that the connection 35.2 is always located in the fluidized area. A differential pressure sensor 35 for detecting the difference between the pressure in the upper and the pressure in the lower chamber can be connected to the two connections 35.1 and 35.2. The differential pressure signal generated by the differential pressure sensor 35 can be transmitted to the controller 80. The controller 80 can determine the exact fill level from the differential pressure.

The fill level in the lower chamber of the working container 1 can be calibrated with the help of the two capacitive sensors 28.3 and 28.4. The powder ejection quantities can be determined for each powder outlet valve 13.1 to 13.*n* by means of a plurality of reference measurements with different settings. Fill level measurements can thereby also be performed during the operation. For this purpose, it is prevented for a certain period of time that powder reaches from the intermediate container 2 into the working container 1. The entire amount of powder, which was conveyed by the used powder outlet valves 13.1 to 13.*x* during a certain period or time, is them determined. The controller 80 then verifies whether the total amount of powder lies within a certain range. If this is not the case, the controller 80 can output information. With regard to this, reference is made to the method for determining an amount of powder or change of the amount of powder in a container known from patent EP 1092958 B1. The content thereof is hereby included in the application.

FIG. 9 shows a possible embodiment of the intermediate container 2 in a longitudinal section. A semi-permeable wall 95, which is permeable for air, but impermeable for powder, is located in the interior of the intermediate container 2. As already described, air can be sucked out of the intermediate container 2 via the connection 2.1 and the valve 24 connected thereto, and a negative pressure can be generated. The semi-permeable wall 95 ensures that the powder sucked into the intermediate container 2 cannot be extracted via the connection 2.1. If compressed air is pressed into the intermediate container 2 by means of the valve 24 and the connection 2.1, said compressed air can flow through the semi-permeable wall 95 and can generate a positive pressure in the intermediate container 2. If the valve 11 is open, the compressed air can also be used to free the wall 95 from powder deposited there.

Figure 10:
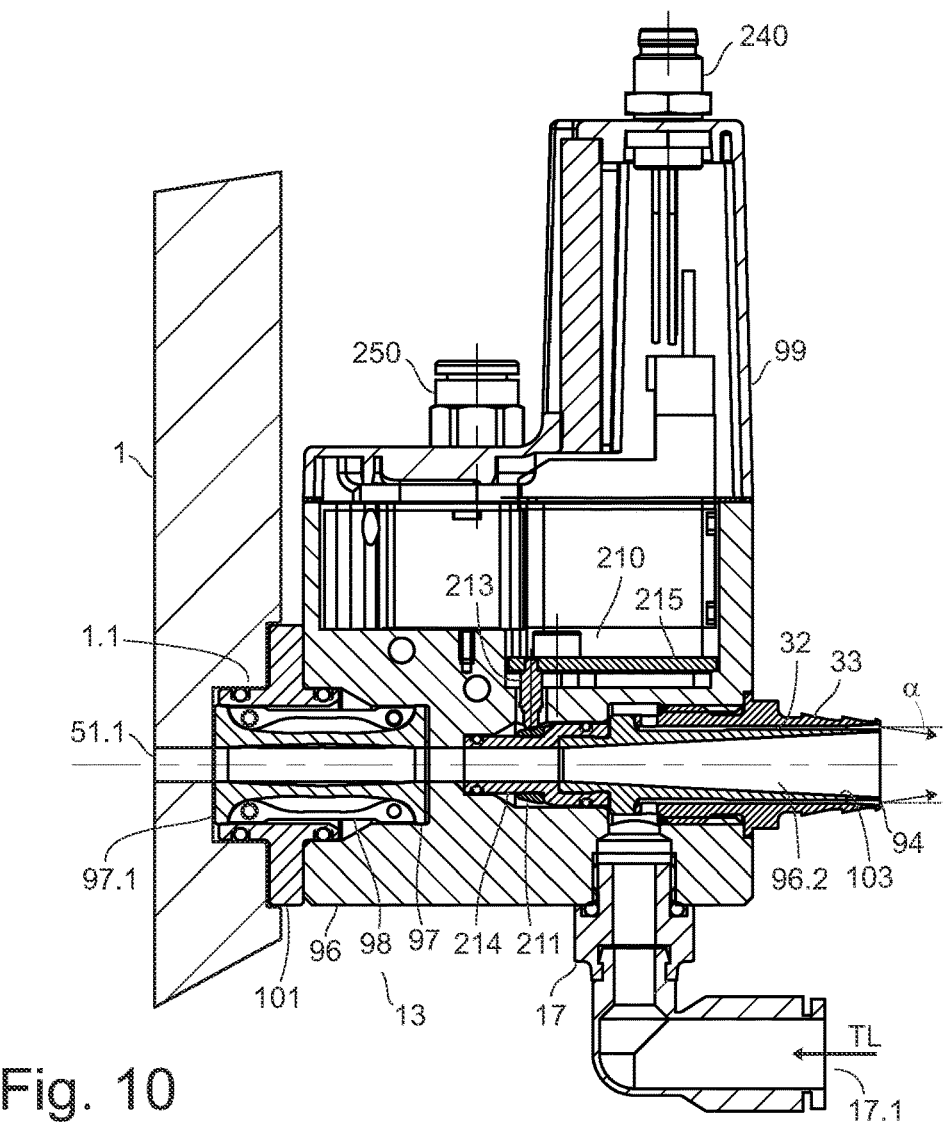
FIG. 10 shows a possible embodiment of a powder outlet valve comprising sensor in section.

FIG. 10 shows a possible embodiment of the powder outlet valve 13, together with a possible embodiment of the influence sensor 210 in section. The outlet valve 13 comprises a valve body 96 and an adapter plate 101. The valve body 96 can be screwed to the adapter plate 101 by means of screws (not shown in the figures). The adapter plate 101, in turn, can also be fastened to the working container 1 by means of screws.

In response to the assembly, the adapter plate 101 is first screwed to the container wall 1; the valve body 96 is then subsequently screwed to the adapter plate 101. In the embodiment shown in FIG. 10, the adapter plate 101 is inserted into a correspondingly embodied accommodation 1.1 on the working container 1. So that the duct in the working container 1 for the powder outlet 51.1 is as short as possible, the accommodation 1.1 is sunk into the working container 1, as shown in FIG. 10, and is embodied as blind hole. The upstream end section 97.1 of the squeezer 97 can likewise be positioned in the accommodation 1.1. This has the advantage that the squeezer 97 is thus positioned correctly. This, however, does not necessarily need to be the case.

The valve 13 additionally comprises a valve control convection block 99, which can be embodied, for example, as electropneumatic quick-action valve. The latter advantageously has a short switching time and a short reaction time. The electrical actuation of the valve 13 takes place via an electrical connection 240, and the compressed air supply of the valve 13 takes place via a compressed air connection 250. The valve control connection block 99 is connected to the corresponding control output of the regulating device 230 via a non-illustrated electrical control cable, which is connected to the electrical connection 240. Via the control signal S, the regulating device 230 can thus arrange for the valve 13 to be opened or closed. The tube squeezer 97, the passage of which is either open or closed—as a function of the compressed air control signal S—is located in the interior of the valve body 96. In the compressed air-free state, the tube squeezer 97 is relaxed and its passage is open. The outer side of the tube squeezer 97 then abuts on the inner side of the ring 98. The ring 98 ensures that—regardless of which pressure prevails in the working container 1—the opening width of the tube squeezer 97 remains the same and is defined in the compressed air-free state. A reproducible opening width of the valve 13 is thus ensured. The ring 98 can be made, for example, of plastic. This setup has the advantage that the pressure in the working container 1 helps in opening the tube squeezer 97. In the case of a powder conveyor, which has to also open the squeezer in the case of negative pressure, this can lead to problems over time.

To control the valve 13, a control valve, which is arranged in the control connection block 99. A so-called normally open valve is used as control valve in the control connection block 99. In the case of failure of the controller 80 or of the regulating device 230, respectively, thus when no control signal S is applied on the control valve, the normally open valve is opened, so that the squeezer 97 of the valve 13 is closed.

When the transport air inlet 17 connects directly to the valve 13, this has the advantage that the supplied transport air TL can essentially mix with the conveyed powder essentially over the entire length of the powder line 40. Such an arrangement, however, is not mandatory. The inlet 17 can also be located farther downstream on the powder line 40.

Alternatively or additionally, an additional air connection for additional air (not shown in the figures) can be provided farther downstream in the powder line 40. This additional air connection, also referred to as additional air adapter, can be arranged in the immediate proximity to the spray applicator 4 or can be integrated into the spray applicator 4. When the spray applicator 4 is created without the additional air, a soft powder cloud can be generated. This can be advantageous, for example, in response to the coating of flat workpieces. If, in contrast, workpieces comprising depressions are to be coated, the spray applicator 4 can be operated with additional air. The powder particles are transported more quickly with the help of the additional air, and a quick powder cloud is created, which can also penetrate into the depressions of the workpiece. The additional air can be controlled by means of the controller 230. The powder cloud can be adapted quickly to different workpiece geometries via the control of the portion of additional air.

It is furthermore advantageous, when the transport air TL flows into the powder line 40 in a ring-shaped manner at a flat angle α. This is possible with the embodiment shown in FIG. 10. The inlet body 101 comprising the inlet 17 for the transport air TL has an air duct 32, which runs axially and which surrounds the downstream end area of the powder duct 96.2 of the valve body 96 in a ring-shaped manner. As shown in FIG. 10, the powder duct 96.2 can run in a funnel-shaped manner and can widen in the downstream direction. The powder duct 96.2 can be embodied as a separate component, which will be referred to below as mouthpiece 103. On the upstream side, a sleeve 214, which supports the measuring electrode 211, can be attached to the mouthpiece 103. In the exemplary embodiment at hand, the measuring electrode 211 is embodied in a ring-shaped manner and is connected to a sensor electronics 215 via the sensor connection 213. As shown in FIG. 10, the sensor connection 213 can be embodied as contact pin and can be pushed onto the measuring electrode 211 by means of a spring (not shown). The sensor electronics 215, in turn, is connected to the controller 230 via the electrical connection 240.

In its downstream end area, the valve body 96 can accommodate a tube stem 33. The powder line 40 or the powder tube, respectively, can be pushed onto and fastened to the tube stem 33. A tube coupling, for example by means of a snap connection (not shown in the figures), is also conceivable here. The inner side of the tube stem 33 and the outer side of the powder duct 96.2 form a ring-shaped transport air duct 32. The downstream end of the tube stem 33 and of the powder duct 96.2 form a ring gap 94, which serves as downstream opening of the transport air duct 32. To supply the transport air duct 32, a transverse bore is provided in the valve body 96. The transport air TL flows through the transport air duct 32 to the downstream end thereof, and from there in a ring-shaped manner and at a flat angle α into the powder line 40.

To allow the transport air TL to flow into the powder line 40 by means of the ring gap 94 has a plurality of advantages. Due to the fact that the transport air TL is introduced through the ring gap 94 into the powder line 40 in such a way that it has the same direction as the main flow, a negative pressure (no air resistance, no barrier) rather than a back pressure is generated at the inlet 17. Fewer turbulences thereby result in the powder line 40. The wear on the wall of the powder line 40 can additionally be reduced or can even be prevented completely.

Other embodiments for the valve body 96 are also possible. The valve body 96 can have, for example, one or a plurality of ducts, via which the transport air TL is introduced into the powder line 40 at an angle of between 0 and 89 degrees. The transport air TL flowing through the ducts is more likely to generate a negative pressure in the powder line 40.

It is also possible to embody the valve body 96 in such a way that the transport air TL flows into the powder line 40 at a 90-degree angle or greater than 90 degrees.

The valve body 96 can also be embodied in such a way that the transport air TL flows into the powder line 40 via a filter tube of micro-porous material.

It can also be provided that the valve 18 is temporarily closed for the transport air TL during the outlet phase A, so that no transport air TL is temporarily introduced into the powder line 40. The impact of the transport air TL on the conveyed amount of powder Q is even further reduced thereby.

If necessary, the powder duct 96.2 of the valve body 96 can be embodied conically on the downstream side of the valve 13.

The powder line 40 can be embodied entirely or partially as tube.

In addition to the powder conveying device 110 and the coating booth 6, the powder coating system can additionally also have a cyclone 7 for recovering the powder, and an afterfilter 8, as shown in FIG. 1.

To remove the overspray from the coating booth 6, it is sucked, together with the air located in the coating both 6, from the booth as powder-air mixture, and is supplied to the cyclone 7, which can be embodied as mono-cyclone. On the top, the powder-air mixture flows tangentially into the cyclone 7, and spirally downwards in the cyclone. Due to the centrifugal force created in response to the rotation of the powder-air flow, the powder particles are pushed to the outside against the outer wall of the cyclone. The powder particles are subsequently conveyed downwards in the direction of the powder outlet of the cyclone and are accumulated there. The air, which is freed from the powder particles, is extracted via a central tube located in the cyclone. The air flow purified in this way can also be supplied to the afterfilter 8, in order to also filter out the residual powder, which remained in the air. When the valve 71 is open, the recycled powder RP can be removed from the cyclone 7 and can be supplied to the powder conveying device 100 again via a pump 73 and a line 41. When the valve 72 is open, the powder thereof filtered out in the cyclone can also be supplied to the afterfilter 8 via the lines 45 and 44.

The afterfilter 8 can be equipped with filter cartridges, which filter out the residual powder particles, which remained in the air. A preferably electrically driven ventilator or a fan ensures the necessary air flow rate.

When no cyclone 7 is used, the powder can also be removed from the afterfilter 8 and can be supplied to the powder conveying device 110 again via the pump 73 and the line 41.

The sensor 210 for determining the actual opening period Tist of the powder outlet valve 13 is preferably embodied as influence sensor.

Figure 4:
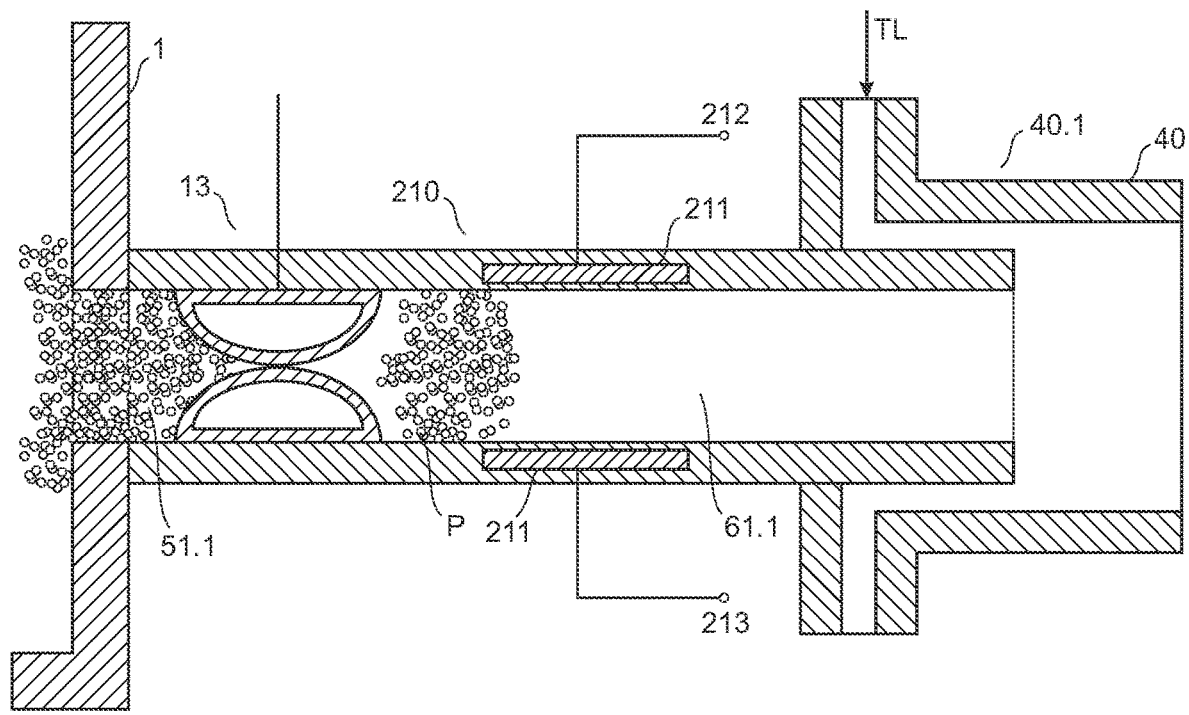
FIG. 4 shows the general setup of a possible embodiment of the sensor used in the powder conveying device and the arrangement thereof in the powder conveying device.

A possible basic setup of such an influence sensor 210 is illustrated in FIG. 4. An electrically conductive measuring element 211, which can be embodied, for example, in a ring-shaped manner, is located in the powder duct 61.1. The measuring electrode 211 is electrically insulated against the powder particles P flowing through the powder duct 61.1.

The measuring principle of the influence sensor 210 is based on the influence effect of electrically charged powder particles P. When bringing a field-generating, for example positively charged powder particles P, or particles in short, close to the neutral measuring electrode 211, which is arranged in an insulated manner, the electrons are pulled towards that end of the measuring electrode 211, which faces the charged particle P. A negative charge forms on this end. A shortage of electrons, and thus a positive charge, forms on the side of the measuring electrode 211 facing away from the particle. In a non-conductor with localized charges, only molecular dipole formation occurs.

If a particle flows through the detection rea of the ring-shaped measuring electrode 211, a first current pulse is created when the particle enters into the detection area of the measuring electrode 211, and a second current pulse with reversed sign when the particle escapes. A prior, systematic charging of the particles is usually not required.

The totality of the electrically charged particles generates a space-charge cloud, which, in turn, generates a corresponding electrical field. The electrical field, together with the particles, moves through the detection area of the measuring electrode 211. Under the influence of the electrical field, a temporary charge transfer of the electrons, which are freely movable in the measuring electrode, takes place (influence). The charge influenced in the measuring electrode 211 thereby has the same value as the charge of that part of the space-charge cloud, which is located in the detection area of the measuring electrode 211. When the space-charge cloud moves in the powder duct 61.1, a current i(t) is generated in the measuring electrode 211, the height of which is a function of the speed v(t) of the cloud, with which it flows through the duct 61.1.

The following applies for the space-charge density $\rho$:

$$\rho((r,\alpha,z)^T,t) = e \cdot n \cdot N((r,\alpha,z)^T,t)$$

whereby the following applies:
N=number concentration,
n=average charge number of the particles,
e=elementary charge,
r, $\alpha$, z=location coordinates,
t=time,
T=transposition.

The charge q enclosed by the measuring electrode 211 can be described by the means of the following equation:

$$q(t) = \int \rho((r,\alpha,z)^T,t)dV = \varepsilon \oint E((r,\alpha,z)^T,t)dS$$

wherein:
E=electric field strength,
$\varepsilon$=dielectric conductivity,
V=volume, which is enclosed by the electrode 211,
S=closed surface area.

The following applies for the current i, which is measured at the outlet of the influence particle sensor 210:

$$i(t) = -\frac{d}{dt}q(t)$$

i=current of the measuring electrode 211 to the mass

Figure 5:
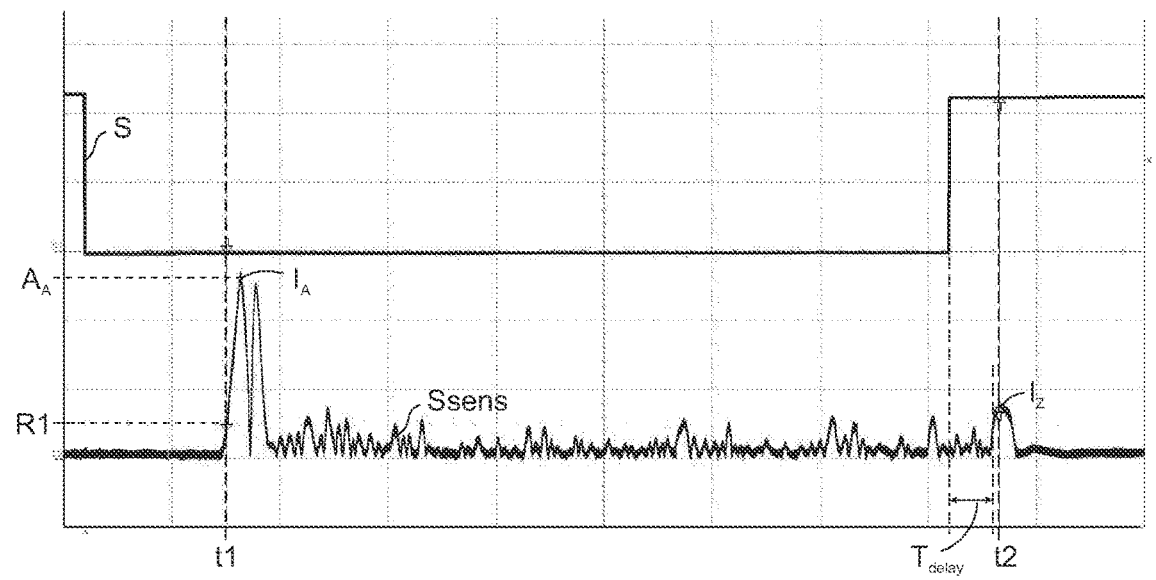
FIG. 5 shows a course of the measuring signal generated by the sensor in an exemplary manner.
Figure 6:
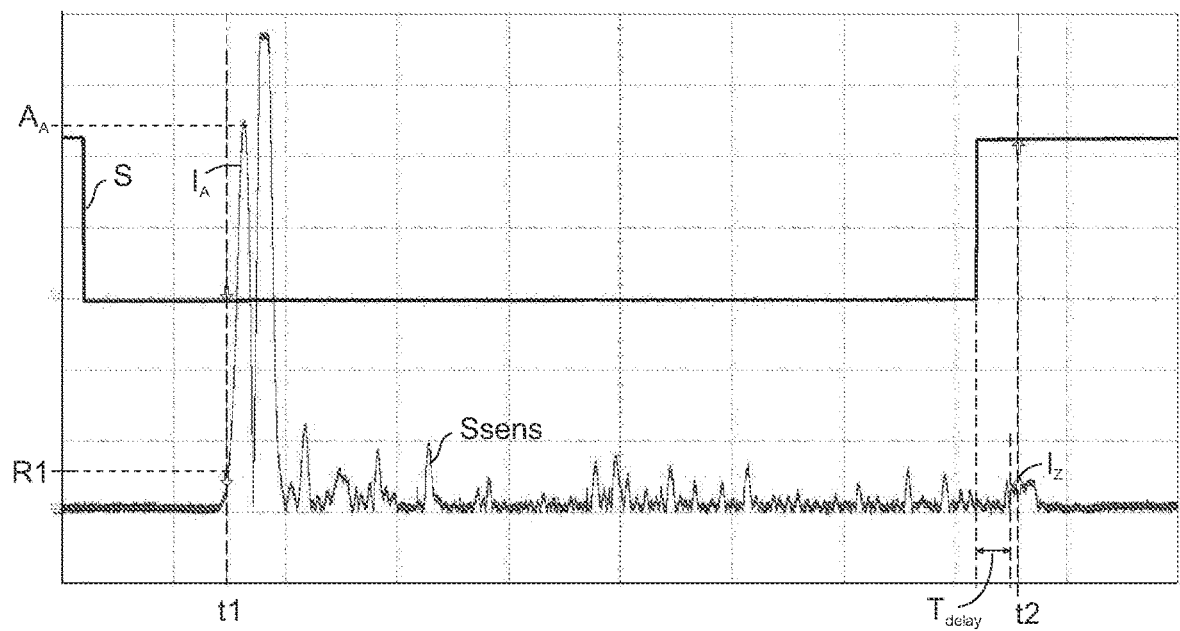
FIG. 6 shows a second course of the measuring signal generated by the sensor in an exemplary manner.
Figure 7:
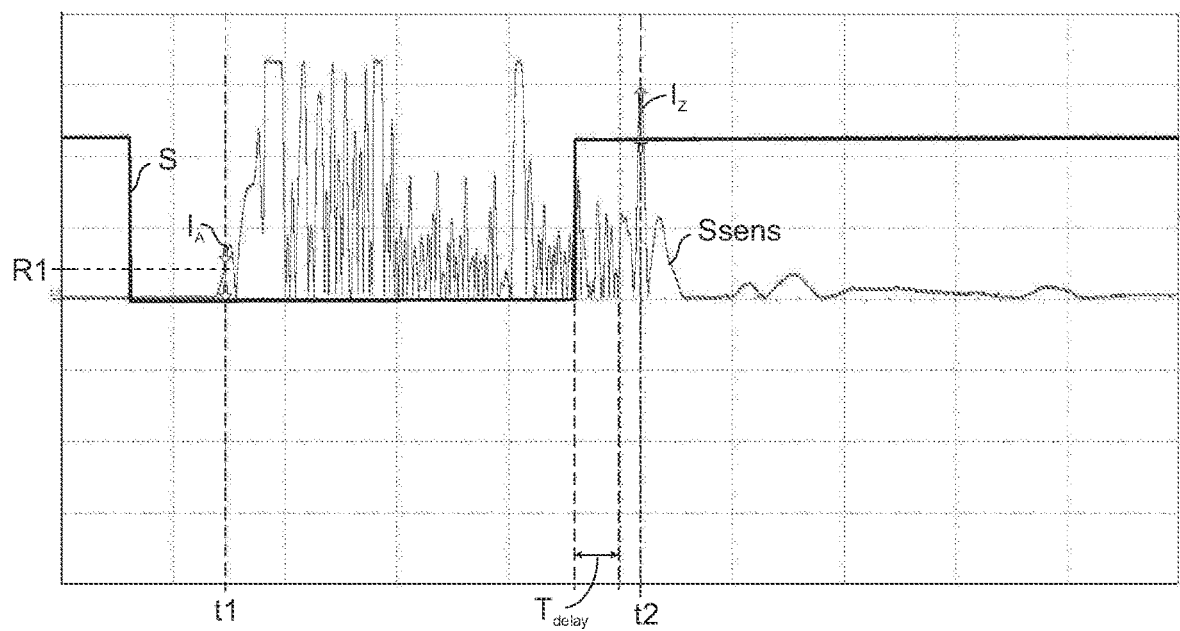
FIG. 7 shows a third course of the measuring signal generated by the sensor in an exemplary manner.

The regulating device 230 generates a control signal S for the powder outlet valve 13. An example for the chronological sequence of such a control signal S is shown in FIG. 5 on the top. The measuring signal Ssens, which is then generated by the sensor 210, is illustrated in FIG. 5. Two further examples for chronological sequences of the control signal S and of the measuring signal Ssens generated by the sensor 210 are illustrated in FIGS. 6 and 7. The actual opening period Tein=t2−t1 for the powder outlet valve 13 can be determined from the measuring signal Ssens. The actual opening period Tein will also be referred to below as actual opening period Tist. It is assumed that the powder outlet valve 13 is actually open at the point in time t1, and is actually closed at the point in time t2.

One possibility for determining the point in time t1 is to compare the signal level of the measuring signal Ssens to a reference value R1. As soon as the signal level of the measuring signal Ssens has exceeded the reference value R1 (which is the case at the point in time t1 in FIG. 5), it is assumed that the outlet valve 13 is open.

The point in time t2 can be determined, for example, as follows. After the outlet valve 13 has been turned off by the controller 230, a certain wait time $T_{delay}$ is maintained. In the case of the sensor signals Ssens shown in FIGS. 5 and 7, for example, the controller 230 considers a wait time $T_{delay}$ of 4 ms in each case. In the case of the sensor signal Ssens according to FIG. 6, the wait time $T_{delay}$=3 ms. The signal peaks appearing during the wait time $T_{delay}$ usually have nothing to do with the turn-off of the outlet valve 13, and are thus disregarded in the determination of t2. Due to the quick compression of the tube squeezer 97 in the outlet valve 13, the powder flowing through the influence sensor 210 is temporarily accelerated. This effect is also reflected in the sensor signal Ssens as pronounced peak $I_z$. A further pronounced signal peak then usually no longer appears in the sensor signal Ssens. The time, at which the peak $I_z$ appears, is t2.

The times t1 and t2 can, for example, also be determined in the following way.

From, for example, n prior measuring signals Ssens1 to Ssensn, the averaged amplitude $A_A$ of the first large pulse $I_A$ is calculated. The threshold value R1 can be calculated from this averaged amplitude $A_A$, for example, as follows:

$$R1 = 0{,}1 * A1$$

The point in time t1 is now that time, at which the amplitude of the measuring signal Ssens reaches the threshold value R1.

Figure 11:
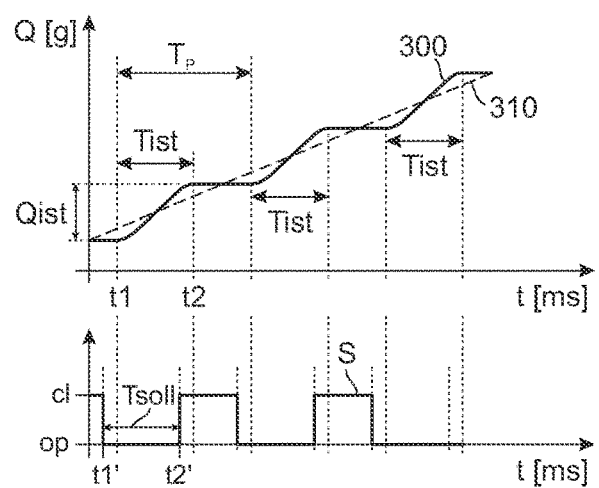
FIG. 11 shows the chronological sequence of the conveyed amount of powder and of the control signal.

In the upper diagram, FIG. 11 shows the chronological sequence of the conveyed amount of powder Q, and the chronological sequence of the control signal S in the lower diagram. When the control signal S is in the state c1, the powder outlet valve 13 is to be closed, so that no powder is conveyed. When the control signal in the state op, the powder outlet valve 13 is to be open, so that powder is conveyed. When the control signal changes from the state c1 to op at the point in time t1', a certain time passes, until the powder outlet valve 13 reacts and opens. The point in time t1 characterized that time, at which the outlet valve 13 actually opens. When the control signal opens from the state op to c1 at the point in time t2', a certain time passes again, until the powder outlet valve 13 reacts and closes. The point in time t2 characterizes that time, at which the outlet valve 13 actually closes.

The setpoint opening period Tsoll can be determined in different ways.

One possibility for calculating the setpoint opening period Tsoll is the following:

$$T\text{soll} = t2' - t1'$$

As mentioned, t1' and t2' are thereby the switching points in time of the control signal S.

A further possibility for determining the setpoint opening period Tsoll is reproduced below. A reference measurement for Tsoll is performed. As described below in the paragraph Calibration, the following method can be used analogously thereby. The setpoint opening period Tsoll is calculated as follows in this case:

$$T\text{soll} = t2 - t1$$

As already mentioned, t1 and t2 are the point in time, at which the powder outlet valve 13 is actually open or closed, respectively. The first determination of Tist would thus be used as period Tsoll (reference measurement) in the diagram according to FIG. 11. The following thus applies for the first measurement:

$$T\text{soll} := T\text{ist} = t2 - t1$$

Starting at the second and each further measurement (actual value measurement), the following applies:

$$T\text{ist}_n = t_n - t_{n-1}$$

The chronological deviation ΔT between setpoint opening period Tsoll and actual opening period Tist, is then as follows:

$$\Delta T = T\text{soll} - T\text{ist}_n = (t2 - t1) - (t_n - t_{n-})$$

In the event that the powder conveying device 110—as described in one of the previous paragraphs—is equipped with a plurality of outlet valves 51.1-51.*n*, and the corresponding sensors 13.1-13.*n*, the evaluation unit 220 can also be embodied and operated such that the actual opening period Tist of the powder outlet valve 51.1 is compared to the actual opening period Tist of the further powder outlet valve 51.*n* by means of said evaluation unit. When the powder conveying device 100 is thus equipped with n outlet valves 51.1-51.*n*, and the corresponding n sensors 13.1-13.*n*, n actual opening periods Tist can also be determined. These n actual opening periods Tist can now be compared to one another by means of the evaluation unit 220, in order to determine, whether one of the n actual opening periods Tist is outside of a previously defined range. The accuracy of the results of the actual opening periods Tist can thus advantageously be further increased.

Instead of embodying the sensor 210 as influence sensor, the sensor 210 can also be embodied as optical sensor or as density sensor or as microwave sensor.

The powder conveyor 100 can also comprise one or a plurality of injectors or a dense flow feed pump. In this case, the sensor 210 is or the sensors 210 are, respectively, preferably arranged in the proximity of the respective injector or of the dense flow feed pump, respectively.

Calibration

The calibration can take place in different ways. One possible type of calibration can take place by using the two capacitive sensors 28.3 and 28.4, and is based on a differential pressure measurement, which has already been described further above. A further possibility for the calibration will be described below.

The powder conveying device can, for example, be calibrated as follows. During a certain period Ts, for example 10 s, the powder outlet valve 13 is open, and the powder is transported to the applicator 4 from the working container 1 via the powder outlet valve 13 and the tube 40, and is injected into a powder catch bag from there. The amount of powder Q, which is caught in the powder catch bag, is subsequently weighed. The powder flow $\dot{Q}$ $$\dot{Q} = \frac{Q}{Ts}$$

can be calculated from the amount of powder Q and from the time period Ts. If an amount of powder Q=50 g is caught, for example during the period Ts=10 s, a powder $$\dot{Q} = 300 \, \frac{\text{g}}{\text{min}}$$

follows therefrom.

The above-described process is also referred to as level calibration.

Each time the powder outlet valve 13 opens for a certain period Tist, a certain amount of powder Qist is conveyed to the applicator 4. Observed over time, a step-shaped course of the conveyed amount of powder Q results directly at the outlet of the outlet valve 13 or in the detection area of the sensor 210, respectively. This course is identified with 300 in FIG. 11. The farther the powder flow in the tube 40 moves in the direction of the applicator 4, the more the steps are smoothened, so that a smooth powder flow reaches the applicator 4 in the end. The course thereof is identified with 310 in FIG. 11.

In a typical application, a cycle $T_P$=300 ms. In the case of an assumed powder flow $$\dot{Q} = 300 \, \frac{\text{g}}{\text{min}},$$

the conveyable setpoint amount of powder is 0.15 g per cycle.

From the analysis of the points in time t1, t1', t2, and t2' or the setpoint opening time Tsoll and the actual opening time Tist, respectively, a conclusion can also be drawn to the deviation of the setpoint amount of powder, which is to be conveyed, from the actually conveyed actual amount of powder ΔQ.

The following numerical example serves to clarify this. The setpoint opening time Tsoll is to be Tsoll=80 ms. As mentioned above, the setpoint amount of powder Qsoll, which is to be conveyed, is to be 0.15 g/$T_P$. It follows from the evaluation of the measuring signal Ssens, which originates from the sensor 210, that the actual opening period Tist is Tist=78 ms. The actual amount of powder Tist from this is as follows:

$$Q\text{ist} = 0{,}15 \frac{\text{g}}{TP} * \frac{78 \text{ ms}}{80 \text{ ms}} = 0{,}1463 \frac{\text{g}}{TP}$$

The deviation ΔQ of the setpoint amount of powder Qsoll, which is to be conveyed, from the actually conveyed actual amount of powder Qist, is now calculated as follows:

$$\Delta Q = Qsoll - Qist$$
$$= 0.15 \text{ g}/T_P - 0.1463 \text{ g}/T_P$$
$$= 0.0037 \text{ g}/T_P$$

The determination of the actual opening period Tist can take place by means of an individual measurement. Instead, it is also possible to calculate the actual opening period Tist from n individual measuring values Tist1 . . . Tistn. Tist can be, for example, the average value from a series of measuring values Tist1 . . . Tistn:

$$Tist = \frac{1}{n} * \sum_{i=1}^{n} Tisti$$

The measurement series Tist1 . . . Tistn can originate, for example, from a measurement, which lasts 10 s or also 1 min.

If necessary, the amount of powder per minute can also be calculated, detected, and averaged, for example. By using the above-specified exemplary values as basis, the following values, which are based on one minute, follow:

$$\dot{Q}soll = Qsoll \cdot \text{number of cycles}$$
$$= 0.15 \frac{g}{Tp} \cdot 200 Tp/\text{min}$$
$$= 300 \frac{g}{\text{min}}$$

$$\dot{Q}ist = \dot{Q}soll \cdot \frac{tist}{tsoll}$$
$$= 300 \frac{g}{\text{min}} \cdot \frac{78 \text{ ms}}{80 \text{ ms}}$$
$$= 292{,}50 \text{ g/min}$$

$$\Delta \dot{Q} = \dot{Q}soll - \dot{Q}ist$$
$$= 300 \frac{g}{\text{min}} - 292{,}50 \frac{g}{\text{min}}$$
$$= 7{,}50 \frac{g}{\text{min}}$$

The preceding description of the exemplary embodiments according to the present invention only serves for illustrative purposes. Different changes and modifications are possible in the context of the invention. For example, the different components of the conveying device and of the coating system shown in FIGS. 1 to 4, 8, 9, and 10, can also be combined with one another in a manner, which differs from the one shown in the figures.

LIST OF REFERENCE NUMERALS 1 working container
1.1 accommodation
1.2 ventilation connection
1.3 cleaning connection
2 intermediate container
2.1 connection on the intermediate container
2.2 powder outlet of the intermediate container
3 storage container
4 applicator
5 applicator
6 coating booth
7 cyclone separator
8 afterfilter
9 ultrasonic screen
10 workpiece
11 valve
12 ventilation valve
13 outlet valve
13.1-13.n outlet valves
14 valve
15 valve
16 valve
17 transport air connection
17.1 inlet for transport air
18 metering device for the transport air
19 fluidizing device
20 vibrating device
21 valve for fresh powder
22 valve
23 valve
24 valve
25 vacuum valve or negative pressure generator
26 valve
27 valve for fresh powder
28 sensor
28.1 pressure sensor
28.2 sensor
28.3 sensor
28.4 sensor
29 sensor
30 storage container
31 pump
32 transport air duct
33 tube stem
34 pressure regulating valve
35 differential pressure sensor
35.1 connection for differential pressure sensor
35.2 connection for differential pressure sensor
40 powder line
40.1 first end of the powder line
40.2 second end of the powder line
41 line
42 line
43 line
44 line
45 line
46 line
47 line
50 powder inlet
51.1-51.n powder outlets
61.1 powder duct
71 valve
72 valve
73 pump
80 controller
90 closure
91 tilt mechanism
92 viewing window
93 cover of the working container
94 ring gap
95 semi-permeable wall
96 valve body
96.2 powder duct
97 tube squeezer
97.1 end section of the tube squeezer
98 ring
99 valve control connection block
100 powder conveyor 101 adapter plate
102 screw
103 mouthpiece
110 powder conveying device
200 setpoint value generator
210 sensor
210.1-210.$n$ sensor 1-sensor n
211 measuring electrode
212 sensor connection
213 sensor connection
214 sleeve
215 sensor electronics
220 evaluation unit
230 regulating unit
240 electrical connection
250 compressed air connection
300 powder flow on the sensor
310 powder flow on the applicator
A discharge phase
D duty cycle
DL compressed air
FL fluidizing air
F conveying phase
FP fresh powder
P powder particles
Q amount of powder
$\dot{Q}$ amount of powder per time unit
R1 threshold value
RP recycled powder
S control signal
TL transport air
t time
t1, t2 point in time
t1', t2' point in time
T period
TPWM period of the pulse width modulated signal
Tsoll setpoint opening period
Tist actual opening period
ΔT deviation
$T_{delay}$ wait time
$T_P$ period or cycle period
α angle

The invention claimed is:

1. A powder conveying device for coating powder, comprising:
a powder conveyor having a powder inlet and a powder outlet duct through which coating powder is conveyable,
a powder outlet valve located in the powder outlet duct, the powder outlet valve being configured to open or close the powder outlet duct for permitting or restricting conveyance of the coating powder therethrough,
a setpoint value generator configured to specify a setpoint opening period of the powder outlet valve,
a sensor configured to determine an actual opening period of the powder outlet valve by detecting the movement of powder in the outlet duct downstream of the outlet valve,
an evaluation unit configured to: (i) receive the setpoint opening period from the setpoint value generator, (ii) receive the actual opening period from the sensor, and (iii) determine the deviation between the setpoint opening period and the actual opening period, and
a controller configured to receive a signal from the evaluation unit corresponding with the deviation, and being configured to control the powder outlet valve in response to the signal for minimizing the deviation between the setpoint opening period and the actual opening period.

2. The powder conveying device according to claim 1, wherein the sensor is mounted in or on the outlet duct downstream of the outlet valve, and is embodied as influence sensor.

3. The powder conveying device according to claim 1, wherein the sensor is mounted on the outlet duct downstream of the outlet valve, and is embodied as optical sensor or as density sensor or as microwave sensor.

4. The powder conveying device according to claim 1, wherein the powder conveyor has a further powder outlet duct,
wherein a further powder outlet valve for opening or for closing the further powder outlet duct is provided, and
wherein a further sensor for determining the actual opening period of the further powder outlet valve is provided.

5. The powder conveying device according to claim 4, wherein the evaluation unit is also provided to determine the deviation between the setpoint opening period of the further powder outlet valve and the actual opening period of the further powder outlet valve.

6. The powder conveying device according to claim 4, wherein a further setpoint value generator for specify a setpoint opening period of the further powder outlet valve is provided.

7. The powder conveying device according to claim 4, wherein the evaluation unit is additionally provided to compare the actual opening period of the powder outlet valve to the actual opening period of the further powder outlet valve.

8. The powder conveying device according to claim 1, wherein the powder conveyor has a powder working container, which can be pressurized.

9. The powder conveying device according to claim 1, wherein the powder conveyor comprises an injector.

10. The powder conveying device according to claim 1, wherein the powder conveyor comprises a dense flow feed pump.

11. The powder conveying device according to claim 1, wherein the powder outlet valve is embodied as tube squeezer.

12. A powder coating system comprising the powder conveying device according to claim 1, wherein a powder applicator, which is connected to the outlet duct of the powder conveying device via a powder line.

13. The powder coating system according to claim 12, wherein the powder applicator is a spray applicator having a spray outlet that opens to an external environment, the spray applicator being configured to spray the powder through the spray outlet into the external environment.

14. The powder coating system according to claim 13, further comprising a pressurizable powder working container configured to contain coating powder under pneumatic pressure, the powder working container having a powder inlet and the outlet duct through which coating powder is conveyable under pneumatic pressure.

* * * * *